United States Patent
Cuberson et al.

(10) Patent No.: US 8,121,029 B2
(45) Date of Patent: Feb. 21, 2012

(54) METHODS AND SYSTEMS FOR PROVIDING SUPPORTED DSL COMMUNICATIONS FEATURES AS SELECTIONS

(75) Inventors: Russel D. Cuberson, Austell, GA (US); Marc L. Warshawsky, Decatur, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 717 days.

(21) Appl. No.: 11/348,049

(22) Filed: Feb. 6, 2006

(65) Prior Publication Data

US 2007/0183324 A1    Aug. 9, 2007

(51) Int. Cl.
*G01R 31/08* (2006.01)
*H04W 4/00* (2009.01)
*H04W 24/00* (2009.01)
*G06F 15/16* (2006.01)
*G06F 15/173* (2006.01)

(52) U.S. Cl. ........ 370/230; 370/252; 709/217; 709/225; 709/238

(58) Field of Classification Search .................. 370/230
See application file for complete search history.

(56) References Cited

U.S. PATENT DOCUMENTS

| | | | | |
|---|---|---|---|---|
| 5,577,115 A * | 11/1996 | Deutsch et al. | ........... | 379/413.02 |
| 5,600,643 A * | 2/1997 | Robrock, II | ........... | 370/399 |
| 5,629,926 A * | 5/1997 | Deutsch et al. | ........... | 370/252 |
| 5,659,350 A * | 8/1997 | Hendricks et al. | ........... | 725/116 |
| 6,044,403 A * | 3/2000 | Gerszberg et al. | ........... | 709/225 |
| 6,091,713 A * | 7/2000 | Lechleider et al. | ........... | 370/248 |
| 6,111,936 A * | 8/2000 | Bremer | ........... | 379/28 |
| 6,151,309 A * | 11/2000 | Busuioc et al. | ........... | 370/328 |
| 6,154,524 A * | 11/2000 | Bremer | ........... | 379/10.03 |
| 6,205,565 B1 * | 3/2001 | Bissett et al. | ........... | 714/49 |
| 6,212,227 B1 * | 4/2001 | Ko et al. | ........... | 375/222 |
| 6,269,101 B1 * | 7/2001 | Gerszberg et al. | ........... | 370/404 |
| 6,307,836 B1 * | 10/2001 | Jones et al. | ........... | 370/230 |
| 6,477,238 B1 * | 11/2002 | Schneider et al. | ........... | 379/22.04 |
| 6,487,285 B2 * | 11/2002 | Gilles et al. | ........... | 379/207.13 |
| 6,584,074 B1 * | 6/2003 | Vasamsetti et al. | ........... | 370/254 |
| 6,678,740 B1 * | 1/2004 | Rakib et al. | ........... | 709/247 |
| 6,748,439 B1 * | 6/2004 | Monachello et al. | ........... | 709/229 |
| 6,766,364 B2 * | 7/2004 | Moyer et al. | ........... | 709/221 |
| 6,785,265 B2 * | 8/2004 | White et al. | ........... | 370/352 |
| 6,836,509 B1 * | 12/2004 | Nordin et al. | ........... | 375/220 |
| 6,856,672 B2 * | 2/2005 | Dunlap | ........... | 379/26.02 |
| 6,970,560 B1 * | 11/2005 | Hench et al. | ........... | 379/417 |
| 6,973,579 B2 * | 12/2005 | Dick et al. | ........... | 375/135 |
| 6,981,186 B2 * | 12/2005 | Ginesi et al. | ........... | 714/717 |
| 6,990,196 B2 * | 1/2006 | Zeng et al. | ........... | 379/417 |
| 6,996,067 B1 * | 2/2006 | Burke et al. | ........... | 370/248 |

(Continued)

OTHER PUBLICATIONS

Technical Report, DSL Forum TR-069, CPE WAN Management Protocol, Produced by: DSLHome-Technical Working Group, Editors: Bernstein at al., Working Group Co-Chairs: Bathrick et al. p. 1-109 (2004).

*Primary Examiner* — Kevin C Harper
*Assistant Examiner* — Thinh Tran
(74) *Attorney, Agent, or Firm* — Andrew Gust; Guntin Meles & Gust, PLC

(57) ABSTRACT

A method of offering Digital Subscriber Link (DSL) communications features includes eliminating selections from a menu of features to be provided via a Customer Premises Equipment (CPE) to a customer premises prior to allowing selections from the menu.

15 Claims, 5 Drawing Sheets

U.S. PATENT DOCUMENTS

| | | |
|---|---|---|
| 7,165,111 B2 * | 1/2007 | Jones et al. .................... 709/227 |
| 7,352,805 B2 * | 4/2008 | Langberg et al. ............. 375/229 |
| 2002/0026503 A1 * | 2/2002 | Bendinelli et al. ............ 709/220 |
| 2002/0032765 A1 * | 3/2002 | Pezzutti ........................ 709/223 |
| 2002/0035515 A1 * | 3/2002 | Moreno .......................... 705/26 |
| 2002/0141387 A1 * | 10/2002 | Orshan ......................... 370/352 |
| 2002/0170063 A1 * | 11/2002 | Ansari et al. .................... 725/95 |
| 2003/0095591 A1 * | 5/2003 | Rekai et al. .................... 375/225 |
| 2003/0225730 A1 * | 12/2003 | Warner et al. ..................... 707/1 |
| 2003/0236087 A1 * | 12/2003 | Stenton ......................... 455/418 |
| 2004/0076222 A1 * | 4/2004 | De Francesco et al. ...... 375/141 |
| 2004/0080323 A1 * | 4/2004 | Bostoen et al. ............... 324/624 |
| 2004/0172658 A1 * | 9/2004 | Rakib et al. .................... 725/120 |
| 2004/0203580 A1 * | 10/2004 | Engelhart ...................... 455/406 |
| 2004/0252703 A1 * | 12/2004 | Bullman et al. ......... 370/395.52 |
| 2004/0254757 A1 * | 12/2004 | Vitale et al. .................... 702/122 |
| 2004/0261116 A1 * | 12/2004 | Mckeown et al. ............. 725/109 |
| 2005/0025136 A1 * | 2/2005 | Anschutz et al. ............. 370/352 |
| 2005/0089064 A1 * | 4/2005 | Zimmerman et al. ........ 370/468 |
| 2005/0152371 A1 * | 7/2005 | Qu ............................. 370/395.1 |
| 2005/0174938 A1 * | 8/2005 | Richardson et al. ....... 370/230.1 |
| 2005/0232242 A1 * | 10/2005 | Karaoguz et al. ............. 370/352 |
| 2006/0123038 A1 * | 6/2006 | Fenton et al. .................. 707/101 |
| 2006/0215689 A1 * | 9/2006 | Liu et al. ....................... 370/465 |
| 2007/0115962 A1 * | 5/2007 | Mammoliti et al. .......... 370/389 |
| 2007/0117559 A1 * | 5/2007 | Trivedi et al. ................. 455/423 |
| 2007/0121612 A1 * | 5/2007 | Nadeau et al. ................ 370/386 |

* cited by examiner

METHODS AND SYSTEMS FOR PROVIDING SUPPORTED DSL COMMUNICATIONS FEATURES AS SELECTIONS

CROSS-REFERENCE TO RELATED APPLICATION

This application is related to U.S. patent application Ser. No. 11/348,073, entitled Methods, DSL modems, and Computer Program Products for Provisioning DSL Service Using Downloaded Username/Password, filed concurrently with the present application, the entirety of which is incorporated herein by reference.

FIELD OF THE INVENTION

The present invention generally relates to the field of electronic communications.

BACKGROUND

High speed Internet access has become popular due in part to the communications features that may be provided using such high speed Internet access. For example, some service providers offer Voice Over IP as a feature to replace plain old telephone service (POTS). This trend may continue as both the popularity of high speed Internet and the number and types of features offered by providers increase.

One of the problems associated with the increased demand for these types of features is that not all high speed Internet service may support the entire range of features offered by providers. Therefore, customers may be frustrated by failed attempts to select features that are compatible with their high speed Internet service.

SUMMARY

Embodiments according to the invention can provide methods, systems, and computer program products for providing supported DSL communications features as selections. Pursuant to these embodiments according to the invention, a method of offering Digital Subscriber Link (DSL) communications features includes eliminating selections from a menu of features to be provided via a Customer Premises Equipment (CPE) to a customer premises prior to allowing selections from the menu.

In some embodiments according to the invention, eliminating includes determining which features offered by a provider are supported by a connection to the customer premises and providing only those supported features as selections on the menu. In some embodiments according to the invention, determining which features offered by a provider are supported by a connection to the customer premises includes transmitting test signals on the connection to the customer premises. Response signals are received on the connection to the customer premises. Bandwidth is determined for the connection to the customer premises based on parameters of the response signals including noise margin, attenuation, amplitude, and/or signal integrity.

In some embodiments according to the invention, determining bandwidth for the connection to the customer premises further includes determining bandwidth for the connection to the customer premises based on parameters associated with the connection including loop-length, a gauge size of a conductor that provides the connection, a geographic location of the customer premises, a customer premises network configuration, a template, CPE functionality, and/or an age of the conductor that provides the connection.

In some embodiments according to the invention, determining which features offered by a provider are supported by a connection to the customer premises includes executing separate tests for the features offered by the provider or executing a single test for the features offered by the provider. In some embodiments according to the invention, eliminating includes allowing input from a customer indicating a request for additional features offered by the provider. Bandwidth is determined for the connection to the customer premises based on parameters of response signals including noise margin, attenuation, amplitude, and/or signal integrity. A determination is made as to which additional features offered by the provider are supported by the bandwidth for the connection or which additional features offered by the provider are not supported by the bandwidth for the connection. Selection of the additional features not supported by the bandwidth is disabled for the connection in the menu and selection of the additional features supported by the bandwidth for the connection is allowed in the menu.

In some embodiments according to the invention, the method further includes allowing input from the customer indicating a request for an increase in the determined bandwidth for the connection responsive to determining that the determined bandwidth does not support all the features offered by the provider. In some embodiments according to the invention, a request for an increase in the determined bandwidth for the connection is a request for an upgraded DSL modem and/or a request for upgraded DSL communications.

In some embodiments according to the invention, eliminating includes receiving an order from a customer for DSL communications features at the customer premises. Delivery of a DSL modem is arranged to the customer premises. Automatic provisioning of the DSL modem is provided using a CPE management system. Bandwidth is determined for the connection to the customer premises. A determination is made as to which features offered by the provider are supported by the bandwidth for the connection or which features offered by the provider are not supported by the bandwidth for the connection. Selection of the features not supported by the bandwidth for the connection is disabled in the menu. Selection of the features supported by the bandwidth for the connection is allowed in the menu.

In some embodiments according to the invention, determining bandwidth for the connection to the customer premises includes an estimate of bandwidth for the connection to the customer premises based on parameters associated with the connection including loop-length, a gauge size of a conductor that provides the connection, a geographic location of the customer premises, and/or an age of the conductor that provides the connection.

In some embodiments according to the invention, a system offering Digital Subscriber Link (DSL) communications features includes a DSL communications feature server configured to eliminate selections from a menu of features to be provided via a Customer Premises Equipment (CPE) to a customer premises prior to allowing selections from the menu.

In some embodiments according to the invention, a system further includes a DSL connection test circuit, coupled to the connection and to the DSL communications feature server, where the DSL connection test circuit is configured to transmit test signals on the connection to the customer premises and receive response signals on the connection to determine parameters of the response signals including noise margin, attenuation, amplitude, and/or signal integrity.

In some embodiments according to the invention, a system further includes a database, coupled to the DSL communications feature server, the database is configured to store parameters of the response signals and parameters associated with the connection including loop-length, a gauge size of a conductor that provides the connection, a geographic location of the customer premises, a customer premises network configuration, a template, CPE functionality, and/or an age of the conductor that provides the connection, wherein DSL communications feature server is further configured to determine bandwidth for the connection to the customer premises based on at least some of the parameters stored in the database.

his description, be within the scope of the present invention, and be protected by the accompanying claims.

DESCRIPTION OF THE EMBODIMENTS ACCORDING TO THE INVENTION

Figure 1:
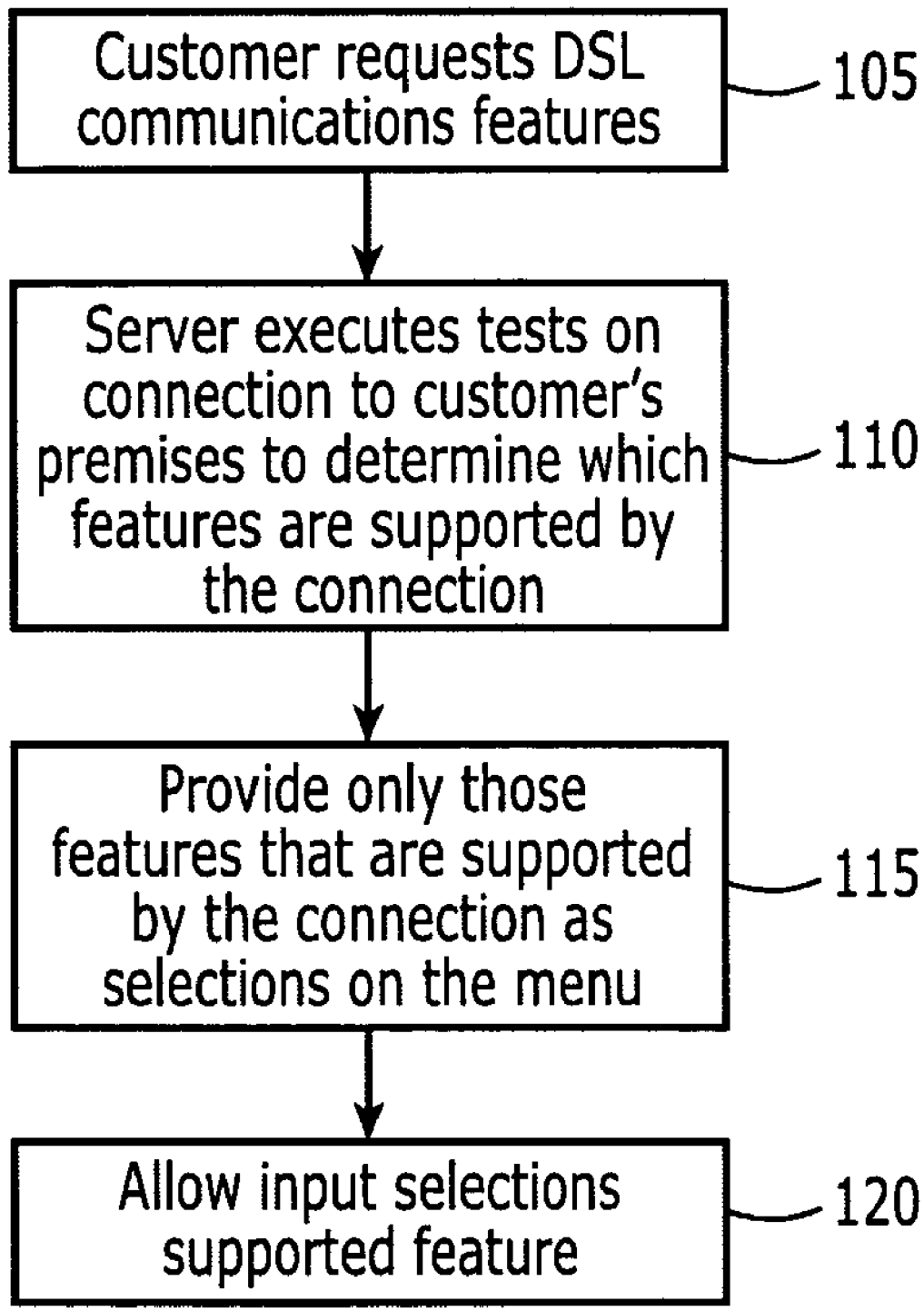
FIG. 1 is flowchart that illustrates operations of DSL communications servers according to some embodiments of the invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The present invention is described below with reference to diagrams (such as block diagrams and flowcharts) and/or operational illustrations of methods, systems and computer program products according to some embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The present invention may be embodied in hardware and/or in software (including firmware, resident software, microcode, etc.) including a combination of both. For example, servers according to some embodiments of the invention may be implemented as a processor circuit that operates according to software executed by the processor circuit. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the block and/or flowchart block or blocks.

The computer code may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

Embodiments according to the invention can operate in a logically separated client side/server side-computing environment, sometimes referred to hereinafter as a client/server environment. The client/server environment is a computational architecture that involves a client process (i.e., a client) requesting feature from a server process (i.e., a server).

As described hereinbelow in greater detail, the DSL communications feature server may eliminate selections from a menu where the selections correspond to features offered by a provider, which are not supportable with the bandwidth allocated to the customer's connection. For example, if a provider offers a feature, such as Voice Over IP, that requires bandwidth which exceeds that allocated to the customer, the selection of Voice Over IP from the menu can be eliminated by the DSL communication feature server. The elimination of the unsupported feature as a selection from the menu may help avoid a customer selecting a feature which cannot be provided using the customer's existing level of service.

In further embodiments according to the invention, the determination that certain features cannot be provided with the existing allocation of bandwidth can be the basis to inquire whether the customer would like to upgrade her level of service so that the selections eliminated from the menu may be made available.

In some embodiments according to the invention, the bandwidth associated with the connection to the customer premises can be determined, at least in part, by a DSL connection test circuit configured to transmit test signals to the customer premises via the connection and to receive signals therefrom. The response signals can be analyzed to determine parameters associated therewith, which can provide an indication of the bandwidth associated with the connection.

In some embodiments according to the invention, the response signal may be analyzed for noise margin, attenuation, amplitude and/or signal integrity to indicate the amount of bandwidth provided by the connection. In still further embodiments according to the invention, parameters such as loop length, gauge size, geographic location, network configuration, templates, CPE functionalities, and/or the age of conductors used to provide the connection can also be used in determining the bandwidth associated with the connection.

In still further embodiments according to the invention, eliminating unsupported features from the menu can be used during an upgrade process wherein an existing customer is requesting additional features to be provided via an already-existing DSL communications service. Therefore, the determination of the bandwidth associated with the connection can be performed over the connection to the existing DSL modem.

In contrast, the bandwidth may also be estimated in situations where the customer is requesting features to be provided via a new DSL communications service. In some embodiments according to the invention, the determination of the bandwidth associated with the connection may be estimated based on, for example, the loop length, the gauge size of the conductors that provide the connection, the geographic location of the customer premises, customer premises network configuration, a template, the DSL modem functionality, and/or the age of the conductors that provide the connection. Accordingly, the determination of the bandwidth associated with the connection can be provided without the DSL modem being installed at the customer premises and, rather, may be estimated based on other known parameters that are or assumed to be associated with the connection.

As used herein, the term "bandwidth" refers to the amount of information or data that can be sent over a DSL connection in a given period of time. The bandwidth associated with the connection can be used as an indication as to whether the connection may support particular applications (i.e., features), such as IP TV, Voice Over IP, 6 megabit per second service, etc. It will be understood that the bandwidth of the connection may then be used as an indication as to whether certain features can operate given the amount of bandwidth allocated to the connection. For example, a connection may require bandwidth of about 12 megabits per second to successfully provide an MPEG stream to provide video data to a customer premises. Therefore, an IP TV feature may not be supported where a connection does not have at least 12 megabit per second of bandwidth allocated thereto.

As used herein, the term "menu" refers to any interface which allows a user to discriminate between different features provided therein and allow the selection of the different features. For example, a menu can provide a list of features, any one of which may be selected. Furthermore, a particular selection of a feature may be eliminated from the menu by either rendering the menu so that the eliminated feature does not appear, or by rendering the feature so that a visual indication that the selection is invalid is provided, or by refusing to accept selection of the eliminated features, regardless of whether the eliminated features actually appears or are visually rendered to indicate that those selections are invalid.

As used herein, the term "DSL communications service" refers to Digital Subscriber Line (DSL) service that provides the transport of data/information so that the features can be provided. It will be understood that the DSL communications service can be equivalent to the bandwidth allocated to the connection and can specify the type of modem, or other CPE, at the customer premises that enables delivery of the features.

As used herein, the term "DSL communications feature" includes applications oriented services, such as IP TV, VoIP and the like including later developed features. A feature can also include a level of service, such as 6 Mb/s, 8 Mb/s, etc., that implies an application that requires this level of bandwidth. It will be understood that Internet Protocol Television (IP TV) refers to digital television service delivered over Internet Protocol via a high speed Internet connection, such as DSL. IP TV data can be transmitted in a compressed format (e.g., MPEG) and decompressed at the customer premises by, for example, a set top box.

Some of the embodiments according to the invention described herein refer to DSL modems. However, it will be understood that the DSL modem may be replaced by any type of CPE, such as a set top box, that operates over multiple ranges of bandwidths.

FIG. 1 is a flowchart that illustrates operations of a DSL communications feature server according to some embodiments of the invention. As shown in FIG. 1, a customer may initially request DSL communications features provided via a DSL communications service (block 105). In particular, a customer may request DSL communications features, such as, Voice Over IP, IP TV, 6 megabits per second service, 8 megabits per second service, etc., which may be provided via existing DSL communications service. It will be understood that an existing connection may already be provided to the customer premises as part of existing DSL communications service.

Before allowing the customer to request the desired DSL communications features, the server determines which of the offered features are actually supported by the connection (block 110). For example, the server may cause tests to be executed to determine whether the bandwidth associated with the connection supports any or all of the features that will be offered to the customer. Upon determining which of the features is actually supported by the bandwidth associated with the connection, the server provides only those features that are supported by the bandwidth associated with the connection as selections on a menu (block 115).

It will be understood that the features that are not supported by the bandwidth associated with the connection may be removed from the menu entirely, visually rendered so as to indicate that such features are not available and should not be selected, or provided in the same fashion as the features that are actually supported, but are not accepted as valid inputs. In such embodiments according to the invention, the server may respond to an invalid selection with a message indicating that the feature is not supported by the bandwidth associated with the customer's connection and is therefore not a valid selection.

The server may further suggest that the customer upgrade her existing DSL communications service so that the otherwise unsupported DSL communications features may be ultimately provided (block 120). For example, the server may indicate to the customer that an unsupported feature on the menu may be provided if the customer agrees to upgrade the existing DSL communications service by, for example, increasing the bandwidth allocated to the CPE at the customer premises or upgrading the customer's existing DSL modem.

As shown by the above, the features which are not supported by the customer's existing DSL communications service can be eliminated from a menu that provides the features to the customer. Eliminating the unsupported features may help avoid the customer making an invalid selection which may otherwise result in the DSL communications provider not meeting the customer's expectations and requirements.

Figure 2:
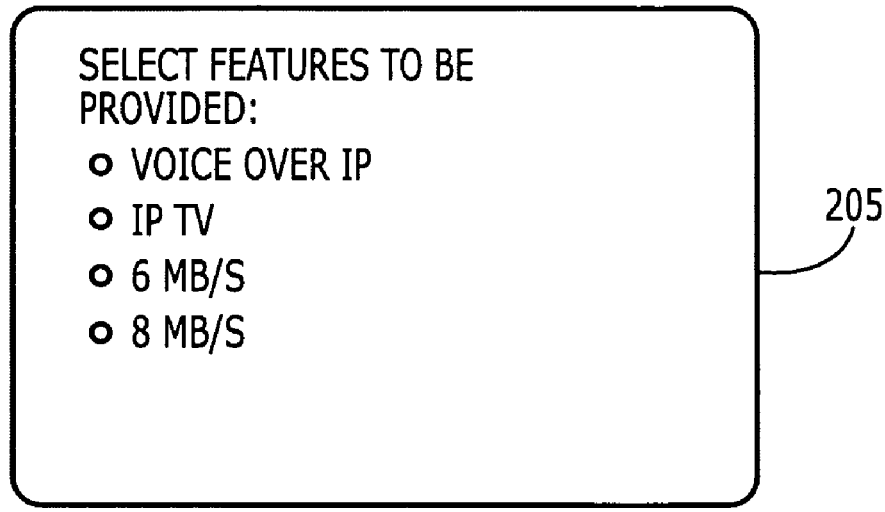
FIGS. 2-3 are graphical representations of menus providing only supported features as selections thereon according to some embodiments of the invention.

FIG. 2 is a graphical illustration of a menu provided by the DSL communication feature server according to some embodiments of the invention. As shown in FIG. 2, a menu 205 lists four features offered by a provider. In particular, the menu 205 offers a Voice Over IP feature which may be used to replace conventional POTS telephone service, an IP TV feature which may be used to view digital streamed video or download and play videos on demand, a 6 megabit per second feature that can be used to support various applications requiring equivalent bandwidth, and/or an 8 megabit per second feature to support various applications requiring equivalent bandwidth. As shown in FIG. 2, the menu 205 further includes text prompting the customer to select the desired features. According to the embodiments illustrated in FIG. 2, the tests executed via the connection to the customer's premises indicate that all listed features may be provided using the determined bandwidth associated with the connection to the customer's premises.

Figure 3:
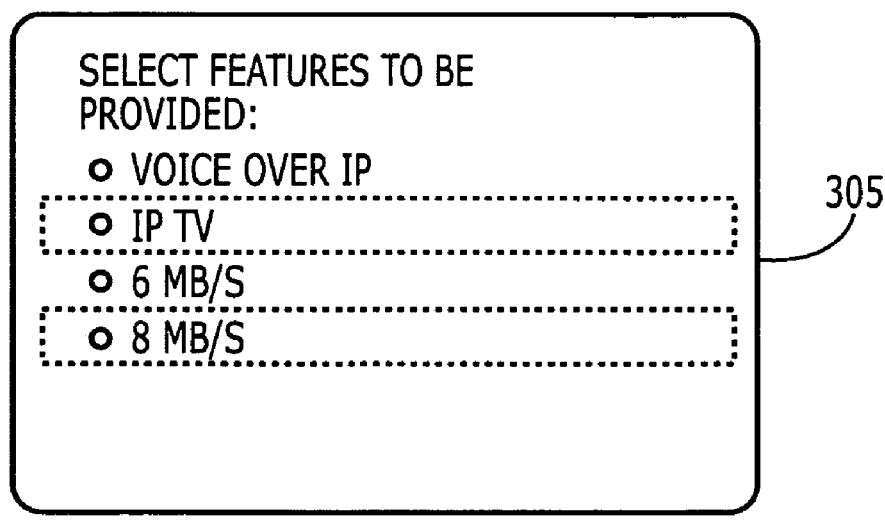

In contrast, FIG. 3 is a graphical illustration of a menu 305 wherein only those features which are supported by the bandwidth associated with the connection to the customer's premises are selectable. In particular, the menu 305 shows that the bandwidth associated with the connection to the customer's premises is determined to be capable of supporting a Voice Over IP feature as well as a 6 megabit per second feature (i.e., the bandwidth associated with the connection is equal to or greater than the bandwidth associated with these features). However, the IP TV and 8 megabit per second features are eliminated from the menu 305 so that these features may not be selected by the customer as the server determines that these features require more bandwidth than currently associate with the connection.

It will be understood that the elimination of the unsupported features from the menu 305 can be provided by de-emphasizing the text and buttons associated with those features (e.g., graying those selections out) and refusing the selection of either of those unsupported features by the customer as input. It will be further understood that eliminating the unsupported features from the menu 305 may also be provided by eliminating any text and buttons associated with the unsupported features from the menu 305 completely or, alternatively, by refusing to accept any selection of the unsupported features.

In some further embodiments according to the invention, the server may recognize the customer's attempted selection of an unsupported feature and may, in response, generate a message to the customer indicating that she has selected an unsupported feature due to the limited bandwidth associated with the connection, and further, that these unsupported features may be made available if the customer agrees to upgrade the DSL communications service currently provided. For example, the customer may be prompted to upgrade the existing DSL communications service bandwidth and/or the existing DSL modem.

Figure 4:
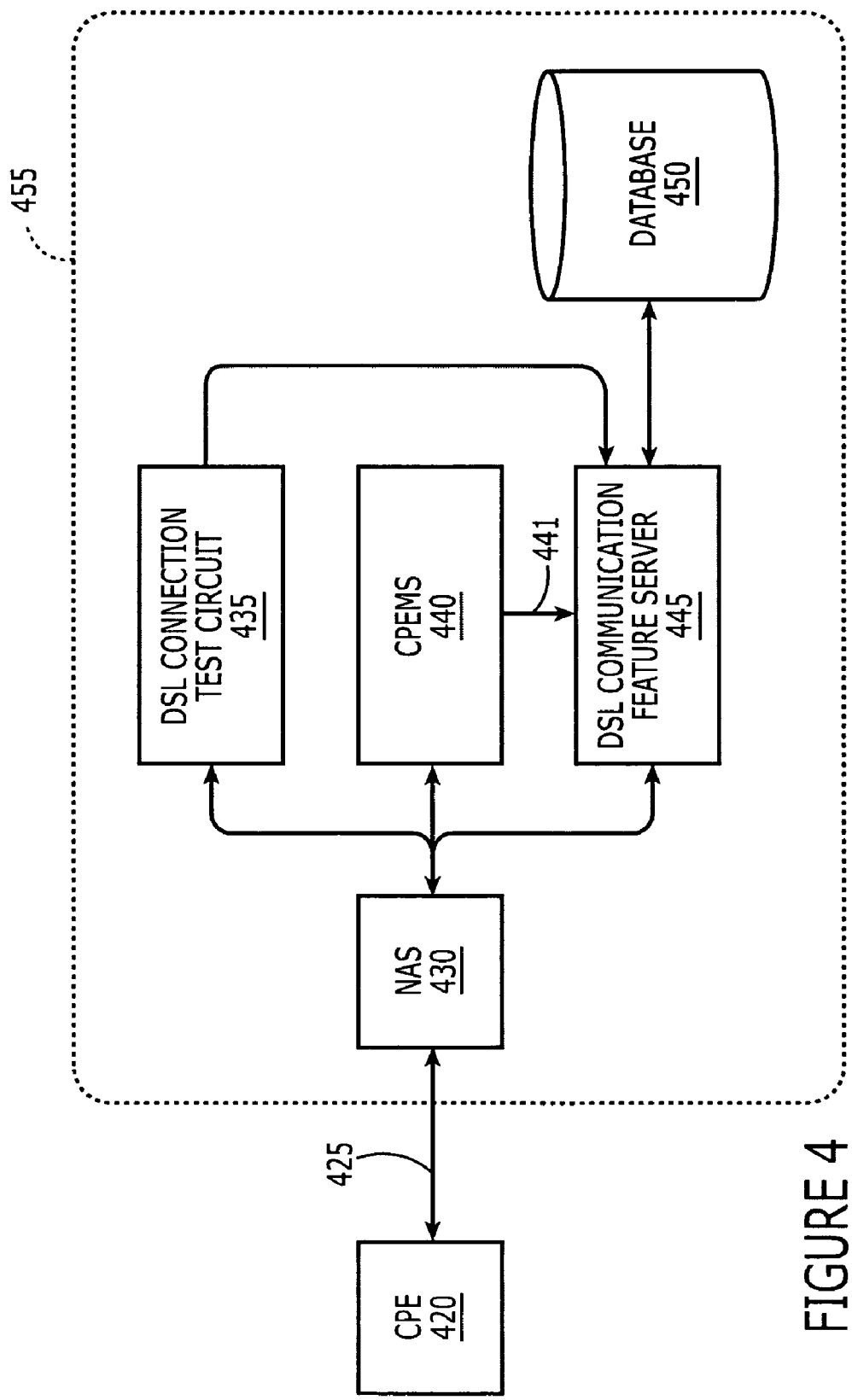
FIG. 4 is a block diagram illustrating DSL communications feature servers and DSL connection test circuits according to some embodiments of the invention.

FIG. 4 is a block diagram illustrating DSL communications features servers 445 and DSL connection test circuits 435 according to some embodiments of the invention. In particular, the DSL modem 420 is located at a customer premises and is provided with DSL communications service from a service provider via a connection 425 through a network access server 430. It will be understood that the network access server 430 provides the DSL modem 420 with connectivity to a network 455 such as the Internet, once the network access server 430 authenticates and authorizes a username/password provided by the customer. As further shown in FIG. 4, the DSL communications feature server 445 is coupled to the network access server 430 thereby enabling a customer to access the DSL communications feature server 445 over the connection 425.

In operation, the DSL communications feature server 445 can allow input from a customer which indicates a request for additional features offered by the provider. For example, a customer may request Voice Over IP, IP TV, 6 megabit per second, or 8 megabit per second as features provided as part of a customer's existing DSL communications service. In response, the DSL communications server 445 initiates tests to determine the bandwidth associated with the connection 425. In particular, the DSL communications server 445 may access the DSL connection test circuit 435, which is configured to transmit test signals to the DSL modem 420 over the connection 425 and receive response signals therefrom. The DSL connection test circuit 435 can analyze the response signals to determine parameters thereof including noise margin, attenuation, amplitude, and/or signal integrity associated with the response signal.

It will be understood that the term "signal integrity" as used herein refers to the shape of the response signal, which may be compared to a stored profile, a comparison to which can indicate the nature of the connection 425. In general, good signal integrity can indicate that higher bandwidth connections may be possible to the DSL modem 420. In contrast, lower signal integrity may indicate that an increase in bandwidth for the connection 425 may not be possible. As understood by those skilled in the art, signal integrity can be affected by parameters, such as, frequency with which the signal is transmitted, the conductor used for the connection 425, and/or mismatches in impedances along the transmission path provided by the connection 425.

The DSL connection test circuit 435 can provide the parameters derived from the response signal to the DSL communication feature server 445. The DSL communications feature server 445 may use at least some of the parameters derived by the DSL connection test circuit 435 to determine the bandwidth associated with the connection 425.

In further embodiments according to the invention, the DSL communications feature server 445 may also use other parameters associated with the customer premises to further determine the bandwidth associated with the connection 425. For example, the DSL communications feature server 445 may access parameters stored in a database 450 including a loop length indicating the distance from a central office to the customer premises, a gauge size of a conductor that provides the connection 425, a geographic location of the customer premises, and/or an age of the conductor that provides the connection 425.

It will be understood that the geographic location of the customer premises can be used to infer bandwidth limitations associated with the connection 425 as environmental factors such as temperature, humidity, etc. can affect the conductors used to provide the connection 425. It will be further understood that the age of the conductors may also indicate the bandwidth associated with the connection 425 as thicker conductors may sustain higher bandwidth than thinner conductors.

In still other embodiments according to the invention, the DSL communications feature server 445 may base the bandwidth determination on parameters such as the functionality of the DSL modem, the network configuration at the customer premises, and/or a template defining the organization of data provided to/from the customer premises. It will be understood that DSL modem functionality may limit the features that can be provided to the customer as some DSL modems do not support all features offered by providers. For example, some DSL modems do not support IP TV. Accordingly, a DSL modem which does not support all of the offered features would limit which features can be selected by the customer. Furthermore, a network configuration, such as a wireless network at the customer premises connected to the DSL modem 420, may be incompatible with some of the features offered by the provider. Data templates (or templates) refer to the type and organization of data transmitted to/received from the premises. In some embodiments according to the invention, the data template is for a TR-106 compliant device, which is described, for example, in DSL Forum TR-106, DSLHome™, entitled, Data Model Template for TR-069-Enabled Devices, the entire content of which is incorporated herein by reference.

In some embodiments according to the invention, the DSL communications feature server 445 determines which of the features offered by the provider are not supported by the bandwidth associated with the connection 425 to the DSL modem 420. For example, if the bandwidth associated with the connection 425 is determined to be 7 megabits per second, the DSL communications feature server 445 can eliminate features which may require bandwidth that exceeds 7 megabits per second from the menu presented to the customer for feature selection. Accordingly, the DSL communications feature server 445 may eliminate IP TV and 8 megabit per second features from the menu provided to the customer in the example above.

In still further embodiments according to the invention, the DSL communications feature server 445 may indicate which features offered by the provider are not currently supportable with the bandwidth associated with the connection 425 provided to the customer. Accordingly, the server 445 may prompt the customer as to whether an upgrade of either the DSL communications service (i.e., bandwidth allocated to the customer's DSL modem) or the DSL modem itself (in situations where, for example, the functionality of the DSL modem prevents the selection of at least one of the features offered by the provider).

Although the embodiments described above in reference to FIG. 4 refer to the customer accessing the DSL communications feature server 445, it will be understood that in some embodiments according to the invention, a customer service representative, rather than a customer, may access the DSL communications feature server 445. In such embodiments according to the invention, the customer service representative may interact with the menu provided by the DSL communications feature server 445 as described above in reference to FIG. 4.

Although the embodiments described above in reference to FIG. 4 include situations where an existing customer is requesting additional features from a service provider, it will be understood that in some embodiments according to the invention, the DSL communications feature server 445 and DSL connection test circuit 435 may be utilized in situations where new service is provided to a customer. In such embodiments, a DSL modem may not be present at the customer premises when the customer or customer service representative accesses the DSL communications feature server 445.

The DSL communications feature server 445 and DSL connection test circuit 435 may operate as described above in reference to FIG. 4, however, the parameters used to determine bandwidth associated with the connection that is ultimately provided to the customer's service may be estimated. For example, in some embodiments according to the invention, the DSL communications feature server 445 may utilize parameters stored in the database 450 which are known to be applicable to the customer premises. For example, DSL communications feature server 445 can base the determination on the approximate loop length that will be provided to the customer premises, the estimated gauge size of the conductor known to be used in the customer premises area, and/or an age of the conductors that will be used to provide the connection.

In embodiments according to the invention, where DSL communications service is yet to be established at the customer premises, a CPE management system (CPEMS) 440 may be used to automatically provision a DSL modem to reduce the interaction required of the customer when installing the DSL modem. Automatic provisioning of DSL modems including the use of default user names and passwords recognized by, for example, a radius server, resulting in the downloading of a unique user name and password to the newly installed DSL modem is described in U.S. patent application Ser. No. 11/348,073 entitled Methods, DSL Modems, and Computer Program Products for Provisioning DSL Service Using Downloaded User Name/Password, filed concurrently with the present application and commonly assigned to the present assignee, the entire contents of which are incorporated herein by reference.

After the automatic provisioning of the DSL modem, the CPEMS 440 may provide an indication 441 that the DSL modem 420 at the customer premises has been provisioned and is ready for feature selection either by the customer or the customer service representative.

Figure 5:
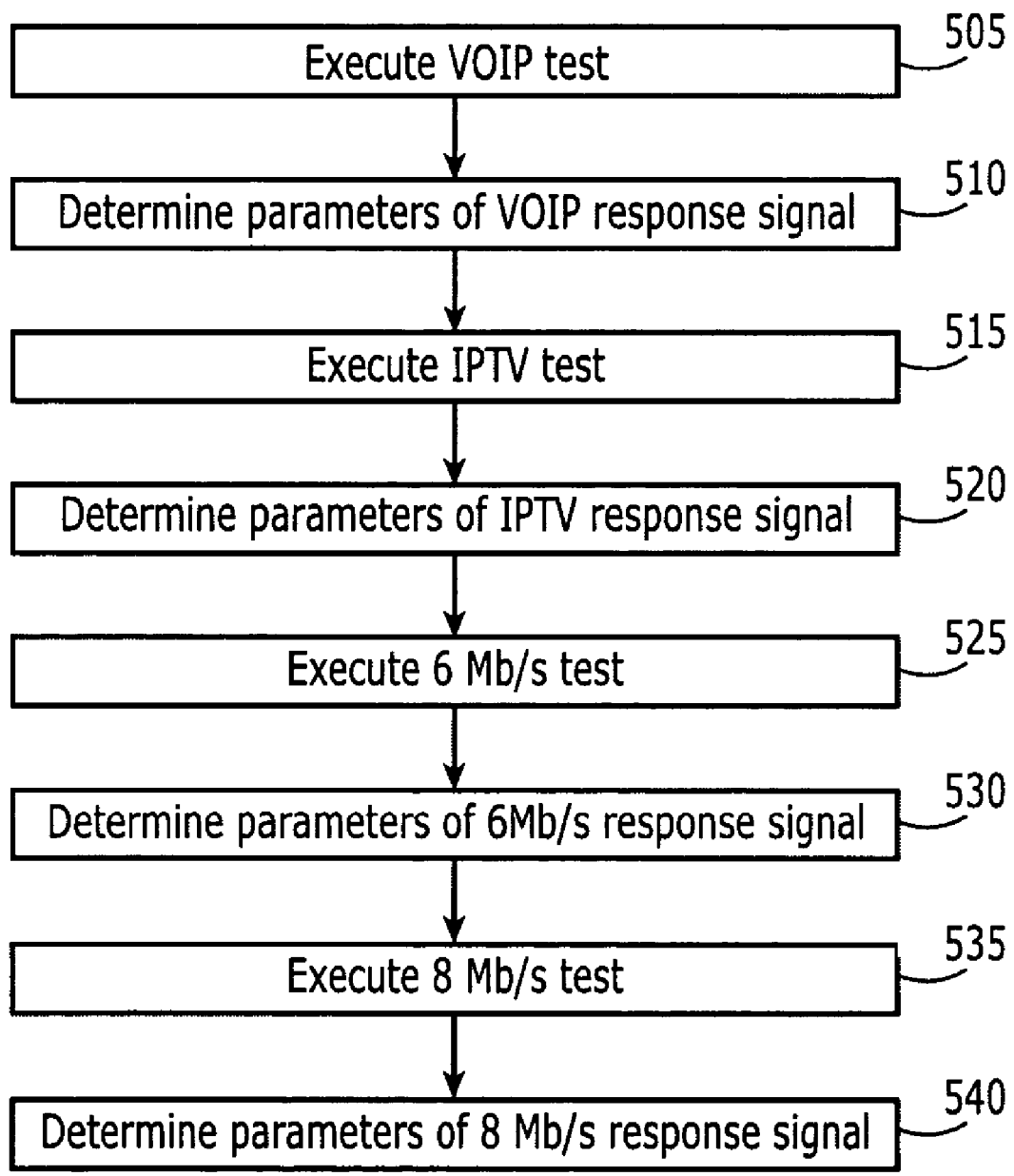
FIG. 5 is a flowchart illustrating operations of tests to used to determine parameters of response signals according to some embodiments of the invention.

FIG. 5 is a flowchart that illustrates separate tests for features offered by a provider according to some embodiments of the invention. According to FIG. 5, a separate determination may be made for each of the features offered by the service provider. In particular, the DSL connection test circuit 435 may execute a Voice Over IP test (block 505) and determine parameters of the VoIP response signal therefrom (block 510). If offered as a feature, the DSL connection test circuit 435 may separately execute an IP TV test (block 515), followed by a determination of parameters of the IP TV response signal (block 520).

If offered as a feature, the DSL connection test circuit 435 can execute a separate 6 megabit per second test (block 525), and determine parameters associated therewith based on the response signal (block 530). If the service provider offers an 8 megabit per second feature, the DSL connection test circuit 435 can execute a separate 8 megabit per second test (block 535) and determine parameters associated with the response signal therefrom (block 540). Accordingly, the DSL communication feature server 445 may be provided with separate determinations of which of the features offered by the service provider can be supported by the bandwidth associated with the connection 425.

Figure 6:
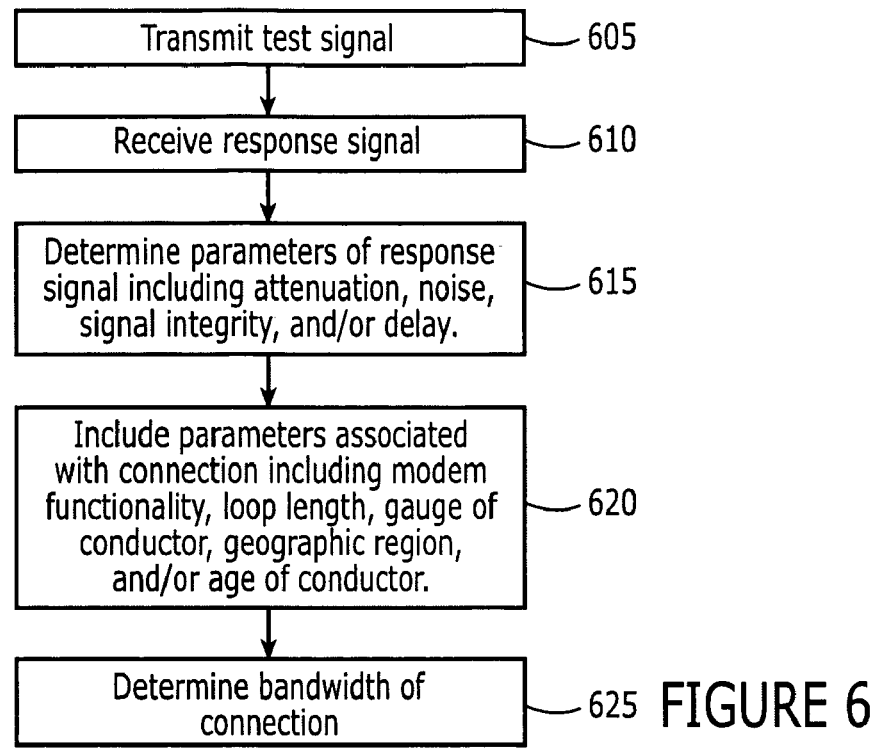
FIG. 6 is a flowchart that illustrates operations of a test used to determine parameters of response signals according to some embodiments of the invention.

In some embodiments according to the invention, the DSL connection test circuit 435 may execute a single test that may be used to determine the bandwidth associated with the connection 425 as illustrated according to the embodiment shown in FIG. 6. According to FIG. 6, a test signal is transmitted by the DSL connection test circuit 435 (block 605). The DSL connection test circuit 435 receives the response signal (block 610), whereupon the DSL connection test circuit determines parameters of the response signal including, for example, attenuation, noise, signal integrity, and/or delay associated with the response signal (block 615).

It will be understood that the DSL connection test circuit 435 may utilize the parameters listed above or alternatively, the DSL communication feature server 445 may utilize the parameters stored in the database associated with the customer premises to which the connection 425 is to be provided when, for example, new DSL communications service and features are to be installed (block 620). The DSL communications feature server 445 can use any or all of the parameters determined by the DSL connection test circuit 435 and/or the parameters stored in the database 450 associated with the customer premises to determine a bandwidth of the connection 425 (used or to be used) to provide features to the customer premises (block 625).

Figure 7:
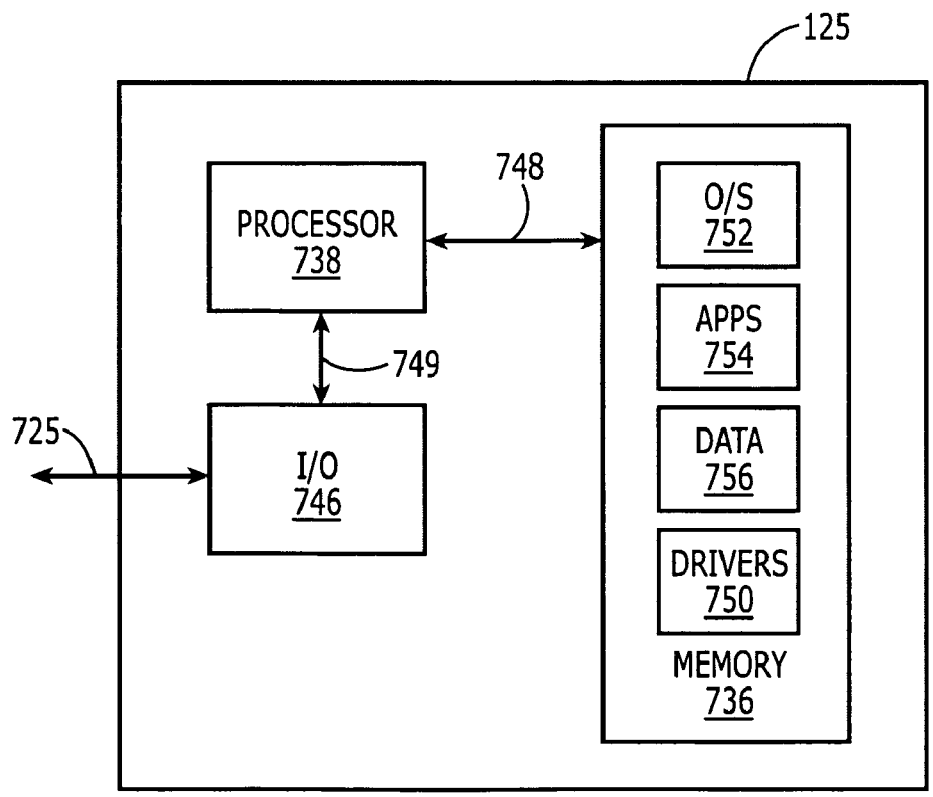
FIG. 7 is a block diagram that illustrates a DSL communications feature server according to some embodiments of the invention.

FIG. 7 is a block diagram of a DSL communications feature server according to some embodiments of the invention. As illustrated, the DSL communications feature server 125 includes a processor 738, a memory 736 and input/output (I/O) circuits 746. The DSL communications feature server 125 may be incorporated in, for example, a general purpose computer, server, or the like. The processor 738 communicates with the memory 736 via an address/data bus 748 and communicates with the input/output circuits 746 via an address/data bus 749.

The DSL communications feature server 125 can be accessed via the connection 725 (via the network access server) through the input/output circuits 746 using, for example, an Internet Protocol (IP) connection. The components in the DSL communications feature server 125 may be known components such as those used in many data processing systems, which may be configured to operate as described herein. In particular, the processor 738 can be any commercially available or custom microprocessor, microcontroller, digital signal processor or the like. The memory 736 may include any memory devices containing the software and data used to implement the functionality circuits or modules used in accordance with embodiments of the present invention. The memory 736 can include, but is not limited to, the following types of devices: ROM, PROM, EPROM, EEPROM, flash memory, SRAM, DRAM and magnetic disk.

As further illustrated in FIG. 7, the memory 736 may include several categories of software to provide operation of the DSL communications feature server 125: an operating system 752; application programs 754 including the software to provide the operations of the DSL communications feature server 125 described herein: input/output device drivers 750; and data 756. In some embodiments according to the invention, the data 756 represents the static and dynamic data used by the application programs 754, the operating system 752, and the input/output device drivers 750, that may reside in the memory 736.

The operating system 752 may be any operating system suitable for use with a data processing system, such as OS/2, AIX or zOS from International Business Machines Corporation, Armonk, N.Y., Windows 95, Windows98, Windows2000 or WindowsXP from Microsoft Corporation, Redmond, Wash., Unix or Linux. The input/output device drivers 750 typically include software routines accessed through the operating system 752 by the application programs 754 to communicate with devices such as the input/output circuits 746 and the memory 736.

As described herein, the DSL communications feature server may eliminate selections from a menu where the selections correspond to features offered by a provider, which are not supportable with the bandwidth allocated to the customer's connection. For example, if a provider offers a feature, such as Voice Over IP, that requires bandwidth which exceeds that allocated to the customer, the selection of Voice Over IP from the menu can be eliminated by the DSL communication feature server. The elimination of the unsupported feature as a selection from the menu may help avoid a customer selecting a feature which cannot be provided using the customer's existing level of service.

In further embodiments according to the invention, the determination that certain features cannot be provided with the existing allocation of bandwidth can be the basis to inquire whether the customer would like to upgrade her level of service so that the selections eliminated from the menu may be made available.

In some embodiments according to the invention, the bandwidth associatied the connection to the customer premises can be determined, at least in part, by a DSL connection test circuit configured to transmit test signals to the customer premises via the connection and to received signals therefrom. The response signals can be analyzed to determine parameters associated therewith, which can provide an indication of the bandwidth associated with the connection.

In some embodiments according to the invention, the response signal may be analyzed for noise margin, attenuation, amplitude and/or signal integrity to indicate the amount of bandwidth provided by the connection. In still further embodiments according to the invention, parameters such as loop length, gauge size, geographic location, network configuration, templates, CPE functionalities, and/or the age of conductors used to provide the connection can also be used in determining the bandwidth associated with the connection.

In still further embodiments according to the invention, eliminating unsupported features from the menu can be used during an upgrade process wherein an existing customer is requesting additional features to be provided via an already-existing DSL communications service. Therefore, the determination of the bandwidth associated with the connection can be performed over the connection to the existing DSL modem.

In contrast, the bandwidth may also be estimated in situations where the customer is requesting features to be provided via new DSL communications service. In some embodiments according to the invention, the determination of the bandwidth associated with the connection may be estimated based on, for example, the loop length, the gauge size of the conductors that provide the connection, the geographic location of the customer premises, customer premises network configuration, a template, the DSL modem functionality, and/or the age of the conductors that provide the connection. Accordingly, the determination of the bandwidth associated with the connection can be provided without the DSL modem being installed at the customer premises and, rather, may be estimated based on other known parameters that are or assumed to be associated with the connection.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method comprising:
    determining a full menu of features available for selection, wherein the features are based on digital subscriber link communications features that are to be provided via a customer premises equipment of a customer premises;
    transmitting test signals on a connection to the customer premises;
    receiving response signals on the connection;
    determining parameters for the connection based on an age, a length and a gauge size of a conductor of the connection and based on parameters of the response signals including signal integrity determined from a comparison of a shape of the response signals with a stored profile;
    determining a set of features offered by a provider that are supported by the connection to the customer premises based on the determined parameters;
    using a network server, eliminating selections from the full menu to generate a supported menu by providing only the set of features as selections, the set of features including less than the full menu of features available for selection so that at least one of the features is eliminated from the full menu; and
    presenting the supported menu to enable selection of any feature in the set of features.

2. A method according to claim 1 wherein determining parameters for the connection to the customer premises further comprises determining bandwidth for the connection based on a geographic location of the customer premises.

3. A method according to claim 1 wherein determining the set of features offered by a provider that are supported by the connection to the customer premises comprises:
    executing separate tests for the features offered by the provider or executing a single test for the features offered by the provider.

4. A method according to claim 1 wherein eliminating comprises:
    allowing input from a customer indicating a request for additional features offered by the provider;
    determining bandwidth for the connection to the customer premises based on parameters of response signals including noise margin, attenuation, amplitude, and signal integrity;
    determining which additional features offered by the provider are supported by the bandwidth for the connection;
    disabling selection of the additional features not supported by the bandwidth for the connection in the menu; and
    allowing selection of the additional features supported by the bandwidth for the connection in the menu.

5. A method according to claim 1 further comprising:
    allowing input from the customer indicating a request for an increase in bandwidth for the connection responsive to determining that the bandwidth does not support all the features offered by the provider.

6. A method according to claim 5 wherein a request for an increase in the determined bandwidth for the connection comprises a request for an upgraded Digital Subscriber Link modem.

7. A method according to claim 1 wherein eliminating comprises:
    receiving an order from a customer for Digital Subscriber Link communications features at the customer premises;
    arranging for delivery of a Digital Subscriber Link modem comprising the customer premises equipment to the customer premises;
    allowing automatic provisioning of the Digital Subscriber Link modem using a customer premises equipment management system;
    determining bandwidth for the connection to the customer premises;
    determining which features offered by the provider are supported by the bandwidth for the connection;
    disabling selection of the features not supported by the bandwidth for the connection in the menu; and
    allowing selection of the features supported by the bandwidth for the connection in the menu.

8. A method according to claim 7 wherein determining bandwidth for the connection to the customer premises comprises an estimate of bandwidth for the connection to the customer premises based on parameters associated with the connection including a geographic location of the customer premises.

9. A system offering Digital Subscriber Link communications features, the system comprising:
    a Digital Subscriber Link communications feature server configured to eliminate selections from a menu of features to be provided via a customer premises equipment to a customer premises prior to allowing selections from the menu, wherein the Digital Subscriber Link communications feature server is further configured to determine a full menu of features available for selection from the menu and then to provide less than the full menu of features available for selection so that at least one of the features is eliminated from the full menu, wherein the Digital Subscriber Link communications feature server is further configured to determine a set of features offered by a provider that are supported by a connection to the customer premises and configured to provide only the set of features as selections on the menu, wherein the set of features are determined based on parameters of response signals received from the customer premises equipment, wherein the parameters include signal integrity determined from a comparison of a shape of the response signals with a stored profile.

10. A system according to claim 9, further comprising:
    a Digital Subscriber Link connection test circuit, coupled to the connection and to the Digital Subscriber Link communications feature server, the Digital Subscriber Link connection test circuit configured to transmit test signals on the connection to the customer premises and receive the response signals on the connection.

11. A system according to claim 10 further comprising:
    a database, coupled to the Digital Subscriber Link communications feature server, the database configured to store parameters of the response signals and parameters associated with the connection including a geographic location of the customer premises, wherein Digital Subscriber Link communications feature server is further configured to determine bandwidth for the connection to the customer premises based on at least some of the parameters stored in the database.

12. A system according to claim 10 wherein the Digital Subscriber Link connection test circuit is configured to execute separate tests for the features offered by the provider.

13. A system according to claim 9 wherein the Digital Subscriber Link communications feature server is further configured to allow input from a customer indicating a request for additional features offered by the provider, determine bandwidth for the connection to the customer premises based on parameters of response signals including signal integrity, determine which additional features offered by the provider are supported by the bandwidth for the connection, disable selection of the additional features not supported by the bandwidth for the connection in the menu and allow selection of the additional features supported by the bandwidth for the connection in the menu.

14. A system according to claim 9 wherein the Digital Subscriber Link communications feature server is further configured to allow input from the customer indicating a request for an increase in the determined bandwidth for the connection responsive to determining that the determined bandwidth does not support all the features offered by the provider.

15. A system according to claim 14 wherein the request for the increase in the determined bandwidth for the connection comprises a request for an upgraded Digital Subscriber Link modem.

* * * * *